US00RE42880E

(19) United States
(12) Reissued Patent
Zalusky

(10) Patent Number: US RE42,880 E
(45) Date of Reissued Patent: Nov. 1, 2011

(54) STROBE LIGHT AND LASER BEAM DETECTION FOR LASER RECEIVER

(75) Inventor: James Thomas Zalusky, Beavercreek, OH (US)

(73) Assignee: Trimble Navigation Ltd, Sunnyvale, CA (US)

( * ) Notice: This patent is subject to a terminal disclaimer.

(21) Appl. No.: 12/469,420

(22) Filed: May 20, 2009

Related U.S. Patent Documents

Reissue of:
(64) Patent No.: 7,224,473
Issued: May 29, 2007
Appl. No.: 10/968,643
Filed: Oct. 19, 2004

(51) Int. Cl.
*G01B 11/14* (2006.01)
*G01B 3/08* (2006.01)

(52) U.S. Cl. ... 356/614; 356/4.01; 356/4.08; 250/214 R; 250/208.2; 250/208.5

(58) Field of Classification Search ..... 356/614–622, 356/4.01, 4.08, 139.04, 141.3, 141.4, 141.5, 356/152.1; 250/214 R, 208.2, 208.5
See application file for complete search history.

(56) References Cited

U.S. PATENT DOCUMENTS

| | | | | |
|---|---|---|---|---|
| 4,062,634 | A | 12/1977 | Rando et al. | |
| 4,240,208 | A | 12/1980 | Pehrson | |
| 5,100,229 | A | 3/1992 | Lundberg et al. | |
| 5,471,218 | A * | 11/1995 | Talbot et al. | 342/357.03 |
| 6,750,953 | B1 | 6/2004 | Douglas | |
| 6,873,413 | B2 | 3/2005 | Douglas | |
| 6,966,387 | B2 * | 11/2005 | Marriott et al. | 172/4.5 |
| 7,019,278 | B2 | 3/2006 | Douglas | |
| 7,030,361 | B2 * | 4/2006 | Douglas | 250/214 R |
| 7,119,316 | B2 * | 10/2006 | Green et al. | 250/206.1 |
| 7,372,011 | B2 * | 5/2008 | Green et al. | 250/214 R |
| 2003/0025902 | A1 | 2/2003 | Hedges et al. | |
| 2003/0058446 | A1 | 3/2003 | Douglas | |

* cited by examiner

*Primary Examiner* — Sang Nguyen
(74) *Attorney, Agent, or Firm* — Frederick H. Gribbell; Roger P. Kennedy

(57) ABSTRACT

A laser receiver detects a thin beam of laser light and distinguishes between the beam of laser light and an omni-directional pulse of light from a strobe by the use of an additional photo-detector. The device takes into account the possibility that the additional photo-detector could be illuminated simultaneously with the main photo-detectors at the end of the main photo-detectors closest to the additional photo-detector.

15 Claims, 4 Drawing Sheets

STROBE LIGHT AND LASER BEAM DETECTION FOR LASER RECEIVER

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to equipment of the type used in surveying and construction and, more particularly, to a detector device for such applications which has an improved photo-detector arrangement for detecting the position of reference light. The light may typically be a rotating laser beam that defines a reference plane of light or a stationary reference plane or cone of laser light. The reference plane may be horizontal or inclined, as dictated by the application.

Laser systems have commonly been employed in surveying and construction in which a laser beam is rotated in either a horizontal or a graded plane. U.S. Pat. No. 4,062,634, issued Dec. 13, 1977, to Rando, illustrates a laser transmitter that provides such a rotating reference beam. The rotating beam defines a reference plane from which various measurements can be made. For example, the elevation of a point remote from the laser transmitter may be measured using a rod on which a laser receiver is mounted. The bottom of the rod rests on the ground, and the operator adjusts the receiver along the rod to a position where it intercepts the laser beam, as indicated by a display on the receiver. One such laser receiver is shown in U.S. Pat. No. 4,240,208, issued Jun. 30, 1987, to Pehrson. Another laser receiver is shown in published U.S. patent application Ser. No. 09/965,661, filed Sep. 27, 2001 and published Mar. 27, 2003 as Publication No. 2003/0058446A1.

Laser receivers operating at construction sites may be illuminated by a number of extraneous light sources that must be ignored or at least distinguished from the laser beam. For example, some types of laser transmitters provide an indication of the azimuth angle of the laser beam relative to a reference direction by transmitting a strobe pulse of light once during each beam rotation. Further, it is common for strobe lights to be used as warning lights at a construction site where machine control and surveying operations are taking place.

It will be appreciated, therefore, that a laser receiver operating in such an environment must be able to distinguish between illumination by a laser beam and illumination by a pulse of light from a strobe source. One way to distinguish between the two is to provide separate detector elements for the laser light and the strobe light, each with optical filters to screen out light except for the frequencies of interest. This may not always be completely effective, however, and in addition to the unwanted interference, the optical filters may also attenuate light to some degree at all frequencies, reducing the sensitivity of the receiver.

It is seen, therefore, that there is a need for a device and method for detecting light from a laser transmitter and from strobe sources, and for distinguishing between the two.

SUMMARY OF THE INVENTION

This need is met by a method and device according to the present invention for detecting a moving, relatively thin beam of laser light, and distinguishing between such a moving, relatively thin beam of laser light and an omni-directional pulse of light. The method may include the step of positioning a plurality of photo-detectors in a generally vertical row. Each of the photo-detectors provides an electrical output when illuminated. An additional photo-detector is positioned at a point remote from the plurality of photo-detectors. A portion of the electrical output of each photo-detector in the row is provided as a first reference signal related to the spacing of the photo-detector from a first end of the row. A portion of the electrical output of each photo-detector in the row is provided as a second reference signal related to the spacing of the photo-detector from the second end of the row. The electrical output of the additional photo-detector is provided as a third reference signal. When the third reference signal is of sufficiently low amplitude, it is interpreted as indicating a simultaneous illumination of one or more of the photo-detectors in the row as illumination by a thin beam of laser light. When the third reference signal is of sufficiently high amplitude, it may be interpreted as indicating a simultaneous illumination of one or more of the photo-detectors in the row as illumination by an omni-directional pulse of light.

The step of positioning an additional photo-detector at a point remote from the plurality of photo-detectors may comprise the step of positioning the additional photo-detector at a point closer to the first end of the row than to the second end of the row. The step of interpreting may further include the step of interpreting a third reference signal of sufficiently high amplitude as indicating simultaneous illumination of one or more of the photo-detectors in the row as illumination by an omni-directional pulse of light only if the first reference signal is less than a value set at approximately four times the third reference signal and also the first reference signal is less than a value set at approximately twice the second reference signal.

This method may further comprise the step of determining the position of the beam of laser light with respect to the row based on the levels of the first and second reference signals from the row of photo-detectors in the event that illumination of the photo-detectors by a moving, relatively thin beam of laser light is indicated.

The method according to the present invention may include the step of providing a plurality of photo-detectors which produce first and second reference signals indicative of the vertical position of the thin beam of laser light with respect to upper and lower limits of detection of the plurality of photo-detectors. An additional photo-detector is provided at a point remote from the plurality of photo-detectors. A first reference signal related to the spacing of the thin beam of laser light from the upper limit of detection of the plurality of photo-detectors, and a second reference signal related to the spacing of the thin beam of laser light from the lower limit of detection of the plurality of photo-detectors are then provided. The electrical output of the additional photo-detector is provided as a third reference signal. A third reference signal of sufficiently low amplitude is interpreted as indicating a simultaneous illumination of the plurality of photo-detectors as illumination by a thin beam of laser light. A third reference signal of sufficiently high amplitude may be interpreted as indicating simultaneous illumination of the plurality of photo-detectors as illumination by an omni-directional pulse of light. The plurality of photo-detectors may comprise first and second photo-detectors, which extend vertically between the upper and lower limits of detection, the first photo-detector being wider adjacent the upper limit of detection and narrower adjacent the lower limit of detection, and the second photo-detector being wider adjacent the lower limit of detection and narrower adjacent the upper limit of detection. Alternatively, the plurality of photo-detectors may comprise a plurality of photo-detectors arranged in a generally vertical row extending between the upper and lower limits of detection.

A device according to the present invention for detecting a moving, relatively thin beam of laser light, and distinguishing between illumination of photo-detectors by such a moving, relatively thin beam of laser light, and illumination of photo-detectors by an omni-directional pulse of light, includes a plurality of photo-detectors arranged in a generally vertical row. Each of the photo-detector elements provides an electrical output when illuminated. A weighting circuit is associated with the plurality of photo-detectors. The weighting circuit provides a portion of the electrical output of each photo-detector as a first reference signal related to the spacing of the photo-detector from a first end of the row, and a portion of the electrical output of each photo-detector as a second reference signal related to the spacing of the photo-detector from a second end of the row. An additional photo-detector, positioned at a point remote from the plurality of photo-detectors, provides an electrical output as a third reference signal. Circuitry, responsive to the reference signals, interprets a third reference signal of sufficiently low amplitude as indicating simultaneous illumination of one or more of the photo-detectors in the row as illumination by a thin beam of laser light. The circuitry may interpret a third reference signal of sufficiently high amplitude as indicating simultaneous illumination of one or more of the photo-detectors in the row as illumination by an omni-directional pulse of light.

The additional photo-detector may be positioned at a point closer to the first end of the row than to the second end of the row. The circuitry may then interpret a third reference signal of sufficiently high amplitude as indicating simultaneous illumination of one or more of the photo-detectors in the row as illumination by an omni-directional pulse of light only if the first reference signal is less than a value set at approximately four times the third reference signal and also the first reference signal is less than a value set at approximately twice the second reference signal.

Accordingly, it is an object of the present invention to provide a device and method for detecting the relative position of reference light; to provide such a device and method in which a plurality of photo-detectors and an additional photo-detector, remote from the plurality, permit the distinction to be made between a beam of laser light and an omni-directional pulse of light, such as light from a strobe source.

Other objects and advantages of the invention will be apparent from the following description, the accompanying drawings and the appended claims.

DETAILED DESCRIPTION OF THE PREFERRED EMBODIMENTS

Figure 1:
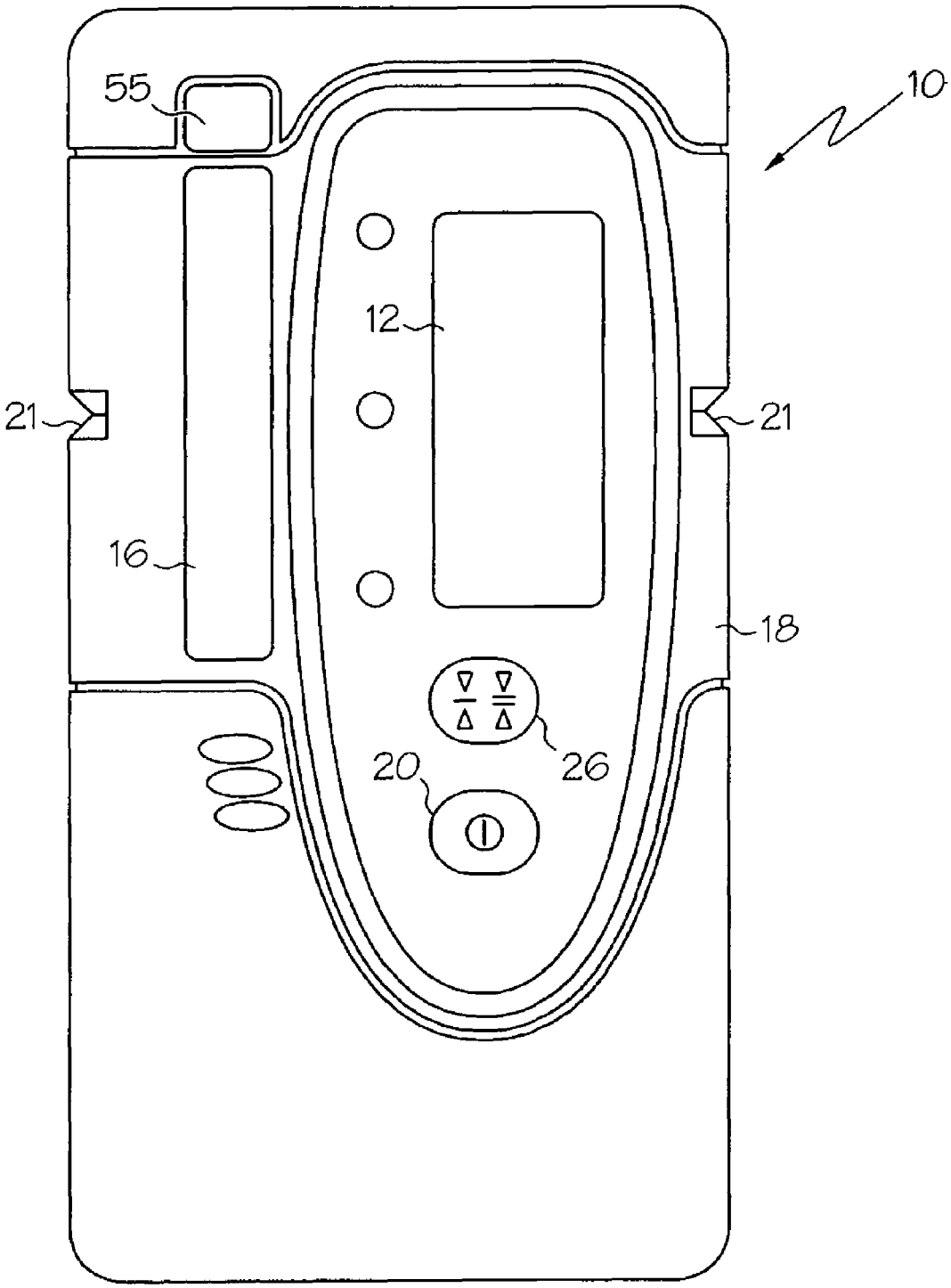
FIG. 1 is a front view of a device according to the present invention for detecting a relatively thin beam of laser light, and distinguishing between illumination of photo-detectors by such a relatively thin beam of laser light, and illumination of photo-detectors by an omni-directional pulse of light.
Figure 2:
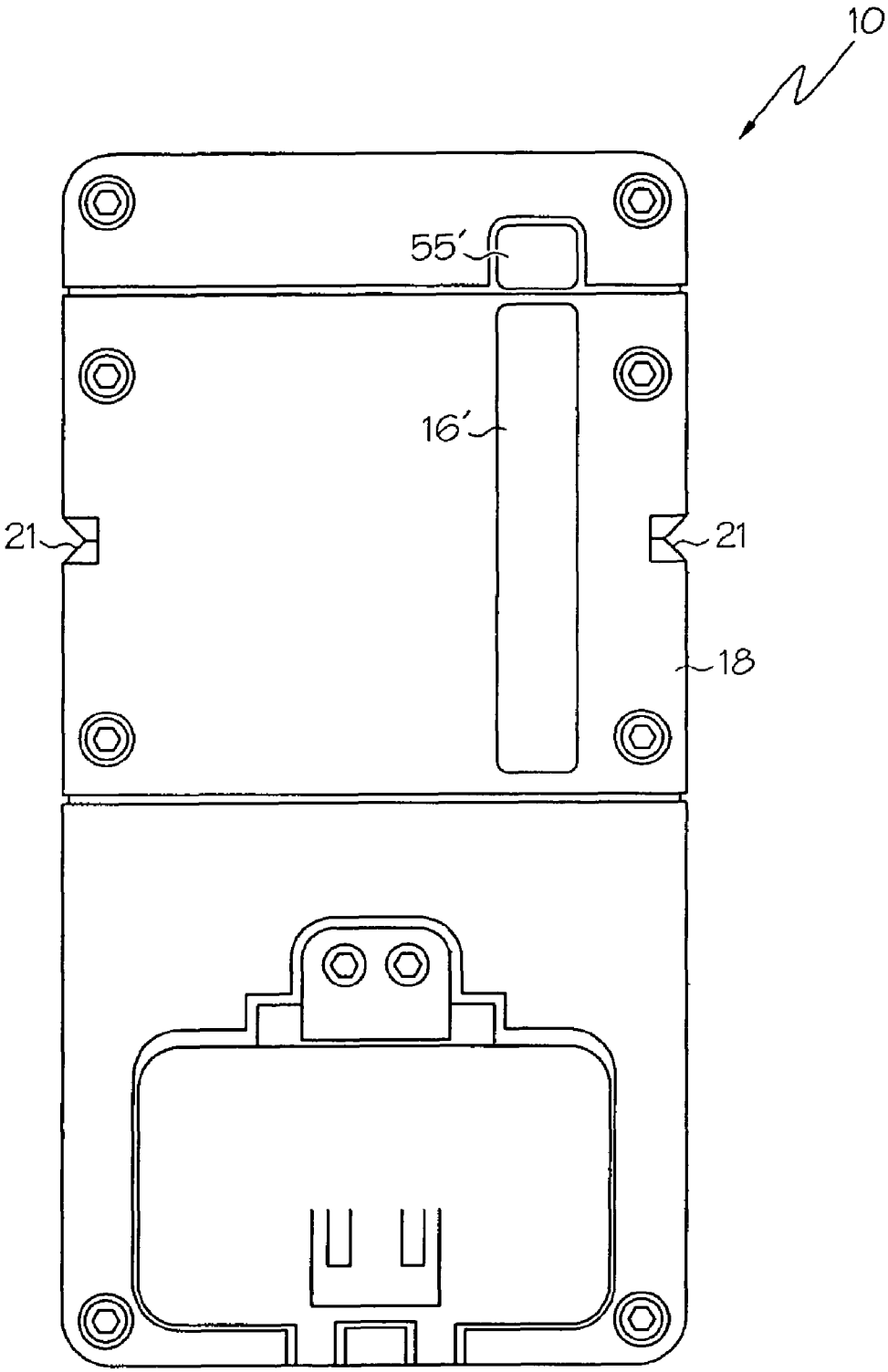
FIG. 2 is a rear view of the device of FIG. 1.
Figure 3:
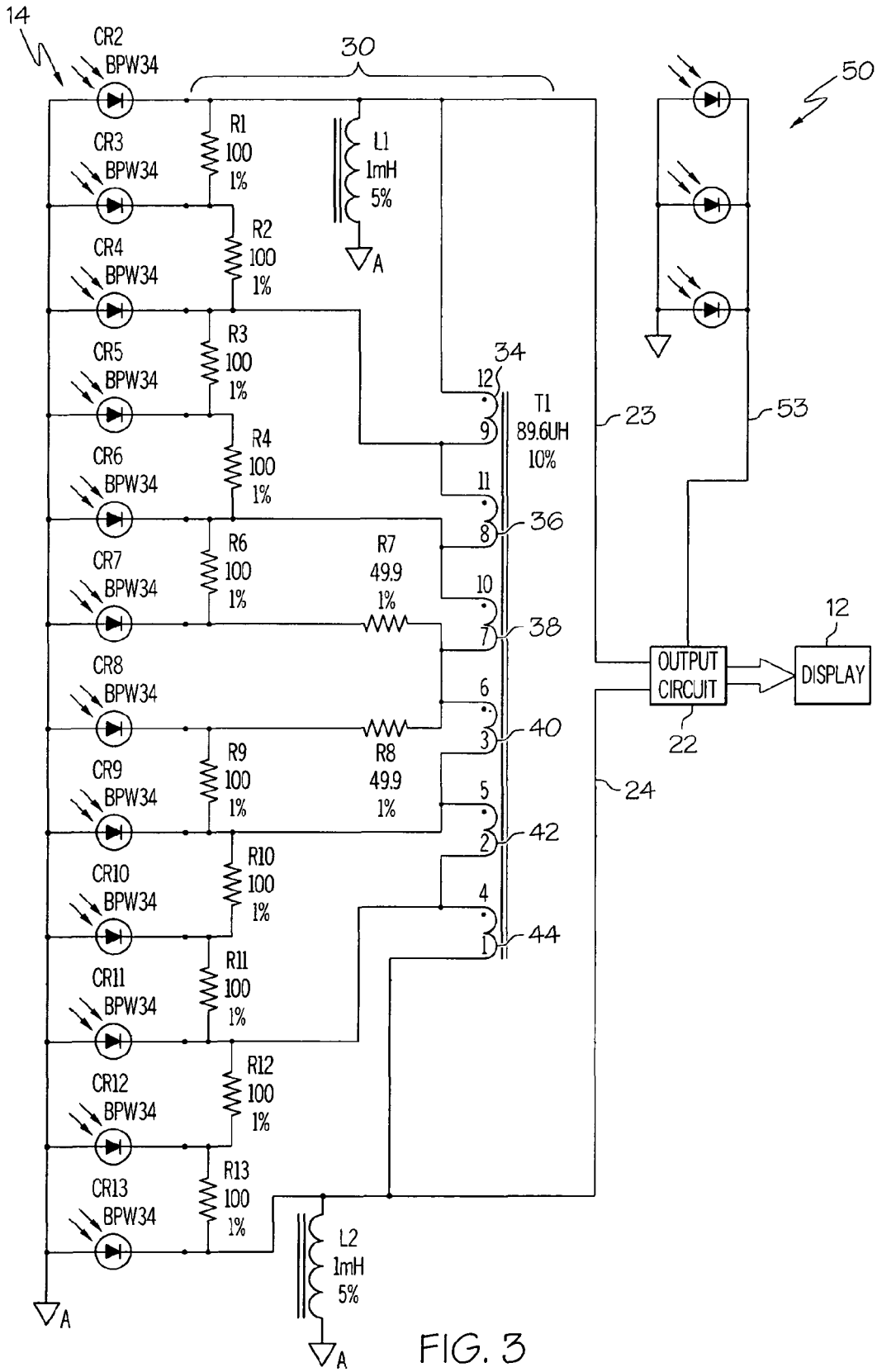
FIG. 3 is a schematic diagram of circuitry included in the device of FIGS. 1 and 2.

Reference is made to FIGS. 1, 2 and 3, which illustrate a detection device 10, constructed according to the present invention. The device detects reference light, such as laser light, and provides an indication of the location of the reference light with respect to the device. The device may also detect reference strobe pulses, as well.

The detector device 10 includes a display 12, and a photo-detector arrangement 14 positioned in window or aperture 16 defined by case 18. A second photo-detector arrangement (not shown) is positioned in window 16' on the back side of the case 18, so that a laser source from either side of the device will be detected. The detector device 10 is switched on by control switch 20, and then positioned at the approximate height of the reference light. The light strikes the photo-detector arrangement 14, and an output circuit 22 provides an indication on display 12 of the position of the reference plane of light with respect to the detector device, and specifically with respect to the reference notches 21 in either side of the case 18. The display 12 indicates whether the light is between the upper and lower limits of detection defined by the photo-detector arrangement 14. If the beam of light is indicated as between the detection limits, the display 12 indicates whether the beam of light is above, below, or within a centered reference band. The height of this reference band can be set to either of several dimensions with switch 26.

The output circuit 22 is responsive to the relative levels of the first and second reference signals on lines 23 and 24, respectively, provided by the photo-detector arrangement 14 and determines the position of the reference light based on the relative amplitudes of those signals. In the illustrated embodiment, the display 12, which may for example be an LCD display, may include a pair of arrows and a bar. An up or down arrow is displayed if the beam is below or above the reference band, respectively. The bar is displayed if the beam is within the band. In an alternative display configuration, the arrows may be replaced by a pair of triangular elements that point toward the center bar. Each of the triangular elements is made up of a series of generally horizontal bars. The bars are switched ON individually to indicate with greater precision the distance by which the detected light is positioned above or below the center reference. As a further alternative, the device may be provided with no display, and with the output from the output circuit 22 being supplied directly to a machine control circuit.

The photo-detector arrangement 14 includes a plurality of photo-detectors comprising PIN diodes CR2, CR3, CR4, CR5, CR6, CR7, CR8, CR9, CR10, CR11, CR12, and CR13, positioned on the device and arranged in a generally vertically oriented row. Each of the plurality of photo-detector CR2-CR13 produces an electrical output when illuminated with the reference laser light, or with other light of sufficient intensity.

The photo-detector arrangement 14 further includes a weighting circuit 30. The weighting circuit 30 includes resistors R1-R4 and R6-R13, inductors L1 and L2 (shunting D.C. sunlight current), and tapped transformer T1. Each of the plurality of photo-detectors CR2-CR13 is connected to the transformer T1, either directly or through one or more of the resistors. The weighting circuit provides a portion of the electrical output of each photo-detector as a component of the first reference signal on line 23, related to the spacing of the photo-detector from the upper end of the row. The weighting circuit also provides a portion of the electrical output of each photo-detector as a component of the second reference signal on line 24, related to the spacing of the photo-detector from the lower end of the row. The weighting circuit 30 is configured such that the first reference signal on line 23 increases as the light moves toward the upper end of the row of PIN diodes, and the second reference signal on line 24 increases as the light moves toward the lower end of the row. Conversely, the first reference signal on line 23 decreases as the light moves toward the lower end of the row of PIN diodes CR2-CR13, and the second reference signal on line 24 decreases as the light moves toward the upper end of the row. When the light is in the middle of the row, the levels of the two reference signals on lines 23 and 24 are equal. The output circuit 22 responds to relative levels of the first and second reference signals on lines 23 and 24 to determine the position of the reference plane of light.

The weighting circuit 30 provides reference current level signals on lines 23 and 24 in the following manner. Assume that only PIN diode CR4 is illuminated. The output current from diode CR4 will be supplied to node 32 of transformer T1. Approximately ⅚th of the current will pass through coil 34 to line 23, while ⅙th of the current will pass through coils 36, 38, 40, 42, and 44 to line 24. In similar fashion, assume that the reference light has moved such that only PIN diode CR9 is illuminated. The output current from PIN diode CR9 will be supplied to node 46 of transformer T1. Approximately ⅔th of the current from diode CR9 will pass through coils 42 and 44 to line 24, while ⅔th of the current will pass through coils 34, 36, 38, and 40 to line 23. Thus the way in which the diode current is split and supplied to lines 23 and 24 gives an indication of which of the diodes is illuminated and, therefore, the position of the reference light.

It will be noted that a number of the photo-detectors are not connected directly to a tap of the transformer T1. For example, diode CR3 has its output supplied to node 48. The current at node 48 is then split, with half passing through resistor R1 to line 23, and the other half passing through resistor R2 to node 32. At node 32, ⅚th of this half of the current passes through coil 34 to line 23, and the remaining ⅙th of this half of the current passes through coils 36, 38, 40, 42, and 44 to line 24. This results in approximately 11/12th of the current being supplied to line 23.

It will be appreciated that the reference light may commonly illuminate more than one of the PIN diodes CR2-CR13 at a time. This may occur because the size of the reference beam of laser light is significantly greater than the size of the photo-detectors. Further, thermal gradients in the air through which the laser light passes may result in rapid positional fluctuation of the beam, effectively illuminating a number of photo-detectors at once as the beam flutters between the elements. The weighting circuit 30 of the present invention splits the current from each of the multiple photo-detectors in dependence upon the position of the photo-detectors in the row. As a consequence, the resulting signal levels on lines 23 and 24 are the sums of the various illuminated photo-detectors and these signal levels accurately reflect the average position of the middle of the beam.

In this regard, note that a reference beam of light that is centered on the row will illuminate at least both diodes CR7 and CR8, providing equal current levels on lines 23 and 24. Any movement of the light upward from the centered position will result in an immediate increase in the current to line 23 and a decrease in the current to line 24. Similarly, any movement of the light downward from the centered position will result in an immediate increase in the current to line 24 and a decrease in the current to line 23. This sensitivity in the middle of the row of photo-detectors is possible as a result of having an even number of photo-detectors in the row. If an odd number of photo-detectors were to be provided in the row, and a very small beam of light detected, it is possible that vertical movement of the beam in this region could occur without moving the beam off of the center photo-detector and without any change in the measured position.

The output circuit 22 preferably includes a separate filter circuit, current-to-voltage amplifier circuit, and peak detection and hold circuit connected in series to each of lines 23 and 24 for processing the first and second reference signals on those lines. Preferably the reference signals are converted to digital form. The relative levels of the processed first and second reference signals are assessed by output circuit 22 to determine the position of the reference plane of light with respect to row of PIN diodes CR2-CR13. This can be accomplished in a variety of ways. For instance, if the relative levels of the first and second reference signals on lines 23 and 24 change linearly as the light moves up and down the row, the reference light will be spaced along the row by a fraction of the row length that is equal to the fraction of one of the reference signals divided by the sum of the first and second reference signals. By this technique, it will be appreciated that the absolute intensity of the light striking the photo-detectors is immaterial. Rather, it is the relative levels of the two reference signals from the circuit 30 that define the position of the reference light. Alternatively, the ratio of the first and second reference signals may be taken and used as the address for a table look up algorithm. It will be appreciated that the position of the reference light may be categorized in broad or narrow bands, or specified with any level of precision desired.

An additional photo-detector 50 is positioned at a point remote from the plurality of photo-detectors, for providing an electrical output as a third reference signal. The output circuit 22 is responsive to the to the third reference signal on line 53. As seen in FIG. 1, the photo-detector 50 is positioned in window 55 which is generally aligned with, but spaced from, the window 16 in which the photo-detector arrangement 14 is positioned. A similar photo-detector (not shown) is provided in a window 55' on the back of the case 18, as seen in FIG. 2.

The additional photo-detectors are used to distinguish between illumination from strobe light pulses and illumination from a narrow laser beam. The output circuit 22 interprets a third reference signal of sufficiently low amplitude as indicating simultaneous illumination of one or more of the photo-detectors in the row as illumination by a thin beam of laser light. This is because the beam of laser light is sufficiently narrow that it is unlikely to illuminate both the photo-detectors CR2-CR13 and the photo-detector 50 at the same time. An illumination of all of the photo-detectors at the same instant including the photo-detector 50, on the other hand, and the generation of a third reference signal of relatively high amplitude is likely to result from a pulse of omni-directional light, such as for example a pulse of light from a strobe. The output circuit 22 will so interpret such a sufficiently high amplitude third reference signal.

Although not shown in FIG. 3, the second photo-detector arrangement positioned in window 16' and the additional photo-detector in window 55' on the back side of the case 18 also provide inputs to weighting circuitry identical to that shown in FIG. 3. The signals from this weighting circuit are then provided to output circuitry 22 for interpretation in the same manner as described above.

It will be appreciated that photo-detector 50 is not spaced from the row 14 of photo-detectors by a large distance. This spacing is limited due to the desire to place the photo-detector 50 on the same circuit board that carries the balance of the photo-detectors. As a consequence it is somewhat more likely that the photo-detector CR2 and the additional photo-detector 50 might be illuminated simultaneously by a widely fluctuating beam of laser light than it is that the photo-detector CR13 and additional photo-detector 50 might be illuminated simultaneously by such a beam. The circuit 22 takes this into account by using a formula that looks at the signal amplitudes on lines 23 and 24 and is more likely to detect a beam strike if the light sensed is close to the end of the photo-detector row closest the additional photo-detector 50. Basically, if the third reference signal on line 53 is of sufficiently high amplitude a strobe pulse is detected if the first reference signal on line 23 is less than four times the third reference signal on line 53 and also the first reference signal on line 23 is less than twice the second reference signal on line 24. If desired a strobe pulse may be detected if the third reference signal on line 53 is of sufficiently high amplitude and if the first reference signal on line 23 is less than a value set as approximately four times the third reference signal on line 53 and also the first reference signal on line 23 is less than a value set as approximately twice the second reference signal on line 24.

Figure 4:
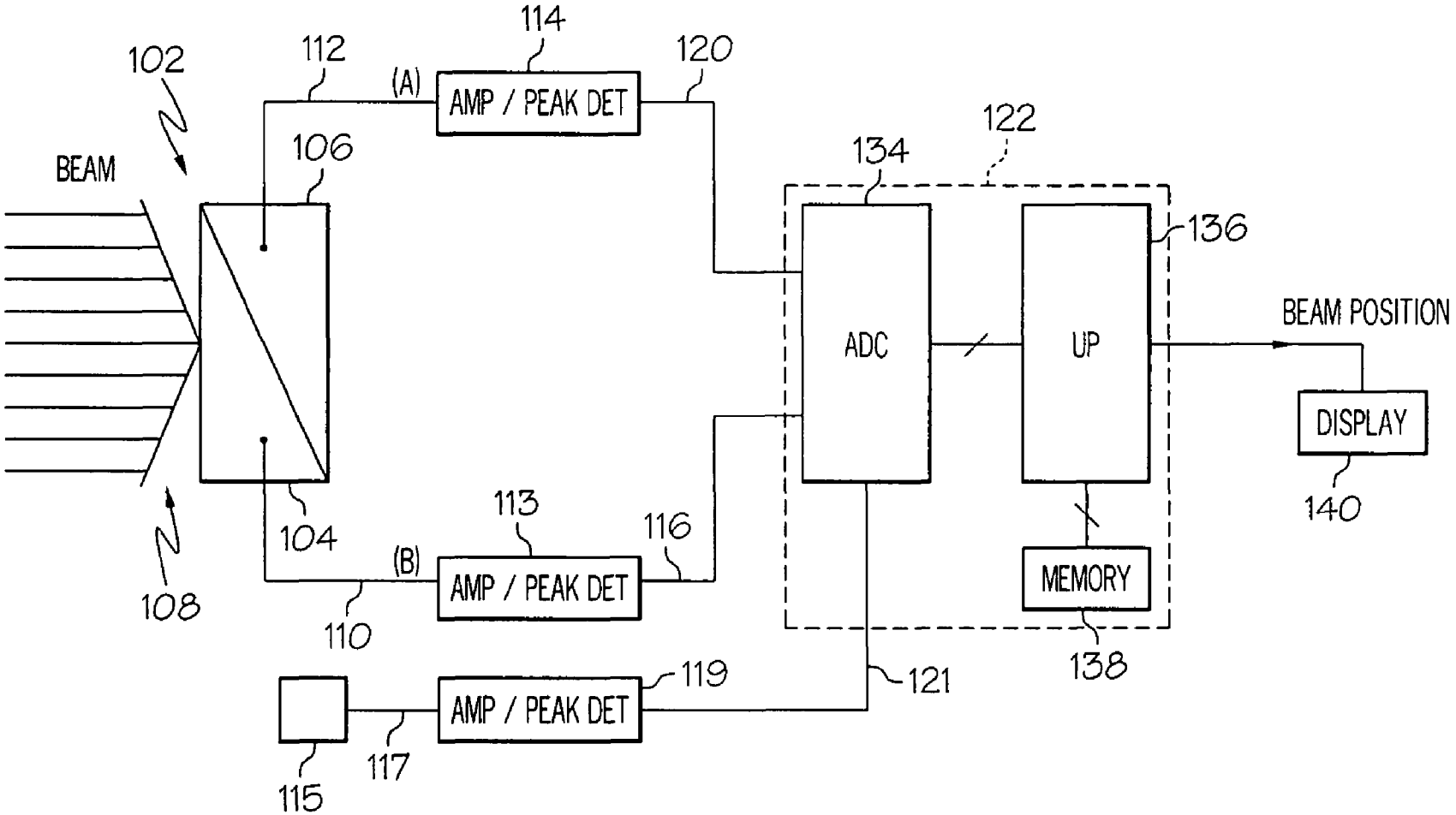
FIG. 4 is a schematic diagram of alternative circuitry to that of FIG. 3.

FIG. 4 schematically illustrates circuitry 100 which may be used in lieu of the circuitry of FIG. 3. In the embodiment of FIG. 4, a photodetector arrangement 102, consisting of first and second photo-detectors 104 and 106, is provided in place of the row of discrete PIN diodes CR2-CR13 found in the embodiment of FIG. 3. Photo-detectors 104 and 106 extend vertically, with the photo-detector 106 being wider adjacent the upper limit of detection and narrower adjacent the lower limit of detection, and the photo-detector 104 being wider adjacent the lower limit of detection and narrower adjacent the upper limit of detection. The first and second photo-detectors 104 and 106 provide first and second reference signals one lines 110 and 112, respectively, indicative of the vertical position of the thin beam of laser light 108 with respect to the upper and lower limits of detection. It will be appreciated that as a beam of laser light sweep across the photo-detectors 104 and 106, the amplitudes of the outputs on lines 110 and 112 will be dependant upon the relative height of the beam. The higher the beam, the more energy will be received by photo-detector 106 and the greater the output on line 112. Similarly, a downward shift in position of the beam will result in the amplitude of the signal on line 110 increasing.

The outputs on lines 110 and 112 are amplified and peak detected by circuits 113 and 114, respectively. It will be appreciated that the wedge shaped photo-detectors eliminate the need for a weighting circuit, such as circuit 30 in FIG. 3. The device includes an additional photo-detector. 115, positioned at a point remote from the first and second photo-detectors 104 and 106, for providing an electrical output as a third reference signal on line 117. The output on line 117 is amplified and peak detected by circuit 119.

A circuit 122 includes an analog-to-digital converter 134 to transform the first, second, and third processor outputs 116, 120 and 121 into digital representations. The output of the analog to digital converter 134 is coupled to a processor 136 which then computes beam position by comparing the digital representations of the signals on lines 116 and 120. This assumes, of course, that the processor has determined that the signals on outputs 116 and 120 are the result of a laser beam strike on the photo-detectors 104 and 106.

The processor 136 is also coupled to a memory device 138, which provides operating instructions and memory locations for completing the necessary computations to determine beam position. Additionally, the processor may be used to drive any number of output devices such a display 140, which provides a visual indication of beam position determined by the processor 136.

As stated above, the processor 136 makes a determination as to whether the device has been illuminated with a thin beam of laser light or a broad pulse of essentially omni-directional light, such as a strobe. For this purpose, processor 136 interprets a third reference signal that is of sufficiently low amplitude as indicating that the simultaneous illumination of one or both of the photo-detectors 104 and 106 as illumination by a thin beam of laser light. That processor 136 may interpret a third reference signal of a sufficiently high amplitude as indicating that the simultaneous illumination of one or more of the photo-detectors 104 and 106 results from an omni-directional pulse of light.

In the example, the additional photo-detector 115 is positioned at a point closer to one limit of detection than to the other limit of detection. Specifically, the photo-detector 115 may be positioned closer to the limit of detection at the broad end of photo-detector 104. It will be appreciated that this could be either the upper or lower limit of detection, depending on the design of the device. The circuitry interprets a third reference signal of sufficiently high amplitude as indicating simultaneous illumination by an omni-directional pulse of light only if the first reference signal is less than a value set at approximately four times the third reference signal and also the first reference signal is less than a value set at approximately twice the second reference signal.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

[1. A method for detecting a moving, relatively thin beam of laser light, and distinguishing between such a moving, relatively thin beam of laser light and an omni-directional pulse of light, comprising the steps of:

positioning a plurality of photo-detectors in a generally vertical row, each of said photo-detector elements providing an electrical output when illuminated, positioning an additional photo-detector at a point remote from said plurality of photo-detectors, providing a portion of the electrical output of each photo-detector in the row as a first reference signal related to the spacing of the photo-detector from a first end of the row, and providing a portion of the electrical output of each photo-detector in the row as a second reference signal related to the spacing of the photo-detector from the second end of said row, providing the electrical output of said additional photo-detector as a third reference signal, and interpreting a third reference signal of sufficiently low amplitude as indicating simultaneous illumination of one or more of said photo-detectors in said row as illumination by a thin beam of laser light, and interpreting a third reference signal of sufficiently high amplitude as indicating simultaneous illumination of one or more of said photo-detectors in said row as illumination by an omni-directional pulse of light.]

[2. The method according to claim 1 in which the step of positioning an additional photo-detector at a point remote from said plurality of photo-detectors comprises the step of positioning said additional photo-detector at a point closer to said first end of said row than to said second end of said row, and in which the step of interpreting further includes the step of interpreting a third reference signal of sufficiently high amplitude as indicating simultaneous illumination of one or more of said photo-detectors in said row as illumination by an omni-directional pulse of light only if the first reference signal is less than a value set as substantially four times the third reference signal and also the first reference signal is less than a value set as substantially twice the second reference signal.]

[3. The method according to claim 1, further comprising the step of determining the position of said beam of laser light with respect to said row based on the levels of said first and second reference signals from said row of photo-detectors in the event that illumination of said photo-detectors by a moving, relatively thin beam of laser light is indicated.]

[4. The method according to claim 3, further comprising the step of displaying an indication of said position of said beam of laser light with respect to said row.]

[5. The method according to claim 1, in which the step of positioning a plurality of photo-detectors includes the step of positioning a plurality of PIN diodes.]

[6. The method according to claim 1, in which the step of providing a portion of the electrical output of each photo-detector in the row as a first reference signal related to the spacing of the photo-detector from a first end of the row, and providing a portion of the electrical output of each photo-detector in the row as a second reference signal related to the spacing of the photo-detector from the second end of said array row includes the step of separating said portions of said electrical outputs using a tapped transformer with each of said plurality of photo-detectors being connected to said transformer.]

[7. A method for detecting a moving, thin beam of laser light, and distinguishing between such a moving, thin beam of laser light and an omni-directional pulse of light, comprising the steps of:

providing a plurality of photo-detectors which produce first and second reference signals indicative of the vertical position of the thin beam of laser light with respect to the upper and lower limits of detection of said plurality of photo-detectors, positioning an additional photo-detector at a point remote from said plurality of photo-detectors, providing a first reference signal related to the spacing of the thin beam of laser light from the upper limit of detection of said plurality of photo-detectors, and providing a second reference signal related to the spacing of the thin beam of laser light from the lower limit of detection of said plurality of photo-detectors, providing the electrical output of said additional photo-detector as a third reference signal, and interpreting a third reference signal of sufficiently low amplitude as indicating simultaneous illumination of said plurality of photo-detectors as illumination by a thin beam of laser light, and interpreting a third reference signal of sufficiently high amplitude as indicating simultaneous illumination of said plurality of photo-detectors as illumination by an omni-directional pulse of light.]

[8. The method according to claim 7, further comprising the step of determining the position of said beam of laser light with respect to said upper and lower limits of detection based on the levels of said first and second reference signals from said plurality of photo-detectors in the event that illumination of said plurality of photo-detectors by a moving, relatively thin beam of laser light is indicated.]

[9. The method according to claim 8, further comprising the step of displaying an indication of said position of said beam of laser light with respect to said upper and lower limits of detection.]

[10. The method according to claim 7, in which the step of providing a plurality of photo-detectors which produce first and second reference signals indicative of the vertical position of the thin beam of laser light with respect to the upper and lower limits of detection of said plurality of photo-detectors includes the steps of:

positioning a plurality of photo-detectors in a generally vertical row extending between said upper and lower limits of detection, each of said photo-detector elements providing an electrical output when illuminated, and providing a portion of the electrical output of each photo-detector in the row as said first reference signal related to the spacing of the photo-detector from a first end of the row, and providing a portion of the electrical output of each photo-detector in the row as said second reference signal related to the spacing of the photo-detector from the second end of said row.]

[11. The method according to claim 7, in which the step of providing a plurality of photo-detectors which produce first and second reference signals indicative of the vertical position of the thin beam of laser light with respect to the upper and lower limits of detection of said plurality of photo-detectors includes the steps of:

providing first and second photo-detectors, which extend vertically between the upper and lower limits of detection, said first photo-detector being wider adjacent said upper limit of detection and narrower adjacent said lower limit of detection, and said second photo-detector being wider adjacent said lower limit of detection and narrower adjacent said upper limit of detection.]

12. A device for detecting a moving, relatively thin beam of laser light, and distinguishing between illumination of photo-detectors by such a moving, relatively thin beam of laser light, and illumination of photo-detectors by an omni-directional pulse of light, comprising:

a plurality of photo-detectors arranged in a generally vertical row, each of said photo-detector elements providing an electrical output when illuminated, a weighting circuit associated with said plurality of photo-detectors, said weighting circuit providing a portion of the electrical output of each photo-detector as a first reference signal related to the spacing of the photo-detector from a first end of said row, and providing a portion of the electrical output of each photo-detector as a second reference signal related to the spacing of the photo-detector from a second end of said row, an additional photo-detector, positioned at a point remote from said plurality of photo-detectors, for providing an electrical output as a third reference signal, circuitry, responsive to the reference signals, for interpreting a third reference signal of sufficiently low amplitude as indicating simultaneous illumination of one or more of said photo-detectors in said row as illumination by a thin beam of laser light, and interpreting a third reference signal of sufficiently high amplitude as indicating simultaneous illumination of one or more of said photo-detectors in said row as illumination by an omni-directional pulse of light.

13. A device for detecting a moving, relatively thin beam of laser light, and distinguishing between illumination of photo-detectors by such a moving, relatively thin beam of laser light, and illumination of photo-detectors by an omni-directional pulse of light, according to claim 12, in which said additional photo-detector is positioned at a point closer to said first end of said row than to said second end of said row, and in which said circuitry interprets a third reference signal of sufficiently high amplitude as indicating simultaneous illumination of one or more of said photo-detectors in said row as illumination by an omni-directional pulse of light only if the first reference signal is less than a value set at approximately four times the third reference signal and also the first reference signal is less than a value set at approximately twice the second reference signal.

14. A device for detecting a moving, relatively thin beam of laser light, and distinguishing between illumination of photo-detectors by such a moving, relatively thin beam of laser light, and illumination of photo-detectors by an omni-directional pulse of light, according to claim 12, in which said circuitry further determines the position of said beam of laser light with respect to said row based on the levels of said first and second reference signals from said row of photo-detectors in the event that illumination of said photo-detectors by a moving, relatively thin beam of laser light is indicated.

15. A device for detecting a moving, relatively thin beam of laser light, and distinguishing between illumination of photo-detectors by such a moving, relatively thin beam of laser light, and illumination of photo-detectors by an omni-directional pulse of light, according to claim 12, in which said photo-detector elements comprise PIN diodes.

16. A device for detecting a moving, relatively thin beam of laser light, and distinguishing between illumination of photo-detectors by such a moving, relatively thin beam of laser light, and illumination of photo-detectors by an omni-directional pulse of light, according to claim 12, in which said weighting circuit comprises a tapped transformer circuit with each of said plurality of photo-detectors being connected to said tapped transformer circuit.

17. A device for detecting a moving, relatively thin beam of laser light, and distinguishing between illumination of photo-detectors by such a moving, relatively thin beam of laser light, and illumination of photo-detectors by an omni-directional pulse of light, comprising:

first and second photo-detectors which extend vertically between the upper and lower limits of detection, said first photo-detector being wider adjacent said upper limit of detection and narrower adjacent said lower limit of detection, and said second photo-detector being wider adjacent said lower limit of detection and narrower adjacent said upper limit of detection, said first and second photo-detectors providing first and second reference signals indicative of the vertical position of the thin beam of laser light with respect to the upper and lower limits of detection, an additional photo-detector, positioned at a point remote from said first and second photo-detectors, for providing an electrical output as a third reference signal, circuitry, responsive to the reference signals, for interpreting a third reference signal of sufficiently low amplitude as indicating simultaneous illumination of one or more of said photo-detectors in said row as illumination by a thin beam of laser light, and interpreting a third reference signal of sufficiently high amplitude as indicating simultaneous illumination of one or more of said photo-detectors in said row as illumination by an omni-directional pulse of light.

18. A device for detecting a moving, relatively thin beam of laser light, and distinguishing between illumination of photo-detectors by such a moving, relatively thin beam of laser light, and illumination of photo-detectors by an omni-directional pulse of light, according to claim 17, in which said additional photo-detector is positioned at a point closer to said upper limit of detection than to said lower limit of detection, and in which said circuitry interprets a third reference signal of sufficiently high amplitude as indicating simultaneous illumination by an omni-directional pulse of light only if the first reference signal is less than a value set at approximately four times the third reference signal and also the first reference signal is less than a value set at approximately twice the second reference signal.

*19. A device for detecting a moving, relatively thin beam of laser light, and distinguishing between illumination of photo-detectors by such a moving, relatively thin beam of laser light, and illumination of photo-detectors by an omni-directional pulse of light, said device comprising:*

*a plurality of photo-detectors generally arranged in a row, said plurality of photo-detector elements providing a plurality of electrical outputs when illuminated;*

*an additional photo-detector, positioned at a point remote from said plurality of photo-detectors, for providing an additional electrical output when illuminated;*

*a plurality of amplifier circuits associated with said plurality of photo-detectors, said plurality of amplifier circuits receiving said plurality of electrical outputs and generating a plurality of reference signals that are indicative of a position where a relatively thin beam of laser light strikes said plurality of photo-detectors;*

*an additional amplifier circuit associated with said additional photo-detector, said additional amplifier circuit receiving said additional electrical output and generating an additional reference signal; and*

*circuitry, responsive to said plurality of reference signals and said additional reference signal, which: (a) determines if an amplitude of said additional reference signal indicates a simultaneous illumination of said plurality of photo-detectors in said row by a relatively thin beam of laser light, and (b) determines if an amplitude of said additional reference signal indicates a simultaneous illumination of said plurality of photo-detectors in said row by an omni-directional pulse of light.*

*20. The device according to claim 19, further comprising: a weighting circuit between said plurality of photo-detectors and said plurality of amplifier circuits, if there are more than two individual photo-detectors of said plurality of photo-detectors.*

*21. The device according to claim 19, wherein said circuitry that is responsive to said plurality of reference signals and said additional reference signal comprises a processor circuit.*

*22. The device according to claim 21, further comprising a display that indicates whether the relatively thin beam of laser light was above, below, or within a centered reference band.*

*23. A device for detecting a moving, relatively thin beam of laser light, and distinguishing between illumination of photo-detectors by such a moving, relatively thin beam of laser light, and illumination of photo-detectors by an omni-directional pulse of light, said device comprising:*

*a plurality of photo-detectors generally arranged in a row, said plurality of photo-detector elements providing a plurality of electrical outputs when illuminated;*

*an additional photo-detector, positioned at a point remote from said plurality of photo-detectors, for providing an additional electrical output when illuminated;*

*a plurality of amplifier circuits associated with said plurality of photo-detectors, said plurality of amplifier circuits receiving said plurality of electrical outputs and generating a plurality of reference signals that are*

*indicative of a position where a relatively thin beam of laser light strikes said plurality of photo-detectors;*

*an additional amplifier circuit associated with said additional photo-detector, said additional amplifier circuit receiving said additional electrical output and generating an additional reference signal; and*

*circuitry, responsive to said plurality of reference signals and said additional reference signal, which: (a) interprets an additional reference signal of sufficiently low amplitude as indicating simultaneous illumination of said plurality of photo-detectors in said row as illumination by a relatively thin beam of laser light, and (b) interprets an additional reference signal of sufficiently high amplitude as indicating simultaneous illumination of said plurality of photo-detectors in said row as illumination by an omni-directional pulse of light.*

*24. The device according to claim 23, further comprising: a weighting circuit between said plurality of photo-detectors and said plurality of amplifier circuits, if there are more than two individual photo-detectors of said plurality of photo-detectors.*

*25. The device according to claim 23, wherein said circuitry that is responsive to said plurality of reference signals and said additional reference signal comprises a processor circuit.*

*26. The device according to claim 25, further comprising a display that indicates whether the relatively thin beam of laser light was above, below, or within a centered reference band.*

* * * * *